United States Patent [19]

Miyata

[11] Patent Number: 4,653,854
[45] Date of Patent: Mar. 31, 1987

[54] CELLULAR REFLEX-REFLECTING SHEETING

[75] Inventor: Nobuhiro Miyata, Tochigi, Japan
[73] Assignee: Seibu Polymer Kasei Kabushiki Kaisha, Tokyo, Japan
[21] Appl. No.: 708,253
[22] Filed: Mar. 5, 1985

[30] Foreign Application Priority Data

Mar. 15, 1984 [JP] Japan .................................. 59-48201

[51] Int. Cl.$^4$ ............................................. G02B 5/128
[52] U.S. Cl. ...................................... 350/105; 404/14
[58] Field of Search ............... 350/103, 104, 105, 106; 404/14

[56] References Cited

U.S. PATENT DOCUMENTS

| | | | |
|---|---|---|---|
| 3,418,896 | 12/1968 | Rideout | 404/14 |
| 3,836,227 | 9/1974 | Holmen et al. | 350/105 |
| 4,023,889 | 5/1977 | Eagon et al. | 350/105 |
| 4,025,159 | 5/1977 | McGrath | 350/105 |

FOREIGN PATENT DOCUMENTS 1036392 7/1966 United Kingdom ................ 350/105

Primary Examiner—John K. Corbin
Assistant Examiner—Loha Ben
Attorney, Agent, or Firm—Koda and Androlia

[57] ABSTRACT

A reflex-reflecting sheeting of a type having on the surface of the sheeting many isolated small compartments which are respectively hermetically sealed in the form of cells is characterized in the structure in which a support film comprises an upper layer which is in contact with glass beads and a lower layer disposed on the opposite side and having larger cohesive force and rubbery elasticity than the upper layer, and a protective film made of a substantially unoriented resin. The sheeting thus constructed exhibits strong resistance against separation of the protective film and the support film even under high temperature and humidity.

14 Claims, 5 Drawing Figures

CELLULAR REFLEX-REFLECTING SHEETING

BACKGROUND OF THE INVENTION

This invention relates to improvements over the structure of reflex-reflecting sheeting of a type having on the surface of the sheeting many isolated small compartments which are respectively hermetically sealed in the form of cells.

First of all, the background of the invention will be described.

A reflex-reflecting sheeting which retroreflects the incident light in the direction of incidence is widely used for various purposes including traffic signs and automobile number plates.

One of factors determining desirable reflex-reflecting properties of the reflex-reflecting sheeting is angle characteristic. As the angle of incidence to the surface of the sheeting increases, the amount of reflex-reflecting light against the amount of the incident light tends to decrease. It is desirable in the reflex-reflecting sheeting that the rate of this decrease in the reflex-reflecting light should be small, that is, the angle characteristic should be good.

In the reflex-reflecting sheeting of a type shown in FIG. 1 which has been used for a long time in the past, incident lights a, b incident upon glass beads 2 which are in contact with a transparent protective, film 1 pass through the glass beads 2 and a transparent focus layer 3 coated in a certain thickness under the glass beads 2 and strike upon and are retroreflected by a metallized layer 4 supported by a support film 5 underlying the focus layer 3.

This transparent focus layer 3 should desirably be coated in a uniform thickness such that it will form a partially spherical contour concentric with the glass beads. If, for example, the thickness of the focus layer 3 in the direction in which the incident light a having the angle of incidence of $-4°$ C. is incident is such that the incident light focuses upon the metallized layer 4 whereas the thickness of the layer 3 in the direction in which the incident light b having the angle of incidence of 30° is incident is greater than that, the incident light b focuses at a point inside the layer 3 and is reflected as diffused light from the metallized layer 4, whereby the angle characteristic of reflex-reflection is deteriorated.

Since, however, the focus layer 3 is a thin layer of about 10–20 $\mu$m which is normally formed by coating of a solvent-type coating, the surface of the coating material tends to become flat due to surface tension thereby making it extremely difficult to form the surface of the layer 3 contacting the metallized layer 4 into a partially spherical contour concentric with the glass beads.

Current Japan Industry Standard Z-9117 and U.S. Federal Standard LS-300C which are directed to the reflex-reflecting sheeting of the type described above allows the rate of decrease of about 50% for the angle of incidence of 30° as compared with the angle of incidence of $-4°$.

It has been long since a reflex-reflecting sheeting of a type which is generally called "capsule type" was proposed for overcoming the disadvantage of the above described conventional type of reflex-reflecting sheeting.

The capsule type reflex-reflecting sheeting is of a structure in which, as shown in FIGS. 2 and 3, a metallized layer 4 is provided directly on the lower hemispheres of glass beads 2 which are disposed in spaced relation below a transparent protective film 1 with isolated hermetically sealed small cells 7 being formed between the glass beads 2 and the protective film 1, and a support film 5 underlying the metallized layer and having the lower hemispheres of the glass beads 2 embedded in the upper portion thereof and the protective film 1 overlying the glass beads 2 are vertically connected together by a connecting wall 6 which is formed in a continuous network in a plan view dividing the surface of the sheeting into hermetically sealed cells 7, 7 of small areas.

This structure obviates the transparent focus layer 3 shown in FIG. 1 and, accordingly, it is not necessary to maintain uniformity of thickness of the focus layer 3. This remarkably contributes to improving of the angle characteristic of the reflex-reflecting sheeting.

A typical example of the capsule type reflex-reflecting sheeting is disclosed in Japanese Patent Publication No. 7870/1965 (the specification of U.S. Pat. No. 3,190,178).

The structure of the reflex-reflecting sheeting and the method for producing the same disclosed in the above publication may be summarized with reference to FIG. 2 as follows: First of all, upper hemispheres of glass beads 2 are embedded provisionally in a support layer (not shown) and a metallized layer 4, 4' is vapor-coated over the lower hemispheres of the glass beads 2 and the surface of the support layer which is not occupied by the glass beads 2. Then support film 5 made of thermoplastic polymer is coated on the metallized layer 4, 4' and a heat-resistant film 8 is provided under the support film 5 to cover the lower surface thereof. The provisional support layer on the opposite side is stripped off and a biaxially-oriented transparent protective film 1 is laid over the upper hemispheres of the exposed glass beads 2. The laminate is heated and pressed from the side of the heat-resistant film 8 by a platen having a network pattern of raised ridges represented by FIG. 3 or of a lattice work for forming desired isolated small cells 7, 7. The support film 5 is partially melted to contact the transparent protective film 1 thereby forming the connecting wall 6 after the pattern of the platen which defines the isolated small cells 7.

While the structure in which the network connection between the protective film 1 and the support film 5 by the connecting wall 6 is formed by utilizing the support film 5 itself without using a separate bonding material is convenient, the material and mechanical structure of the support film 5 must have not only sufficient strength and flexibility but also properties necessary for an adhesive, i.e., sufficient cohesive force within the material itself and sufficient adhesive force relative to the protective film 1.

Selection of a suitable material for realizing such type of reflex-reflecting sheeting in a practicable form requires many tests and studies in addition to general knowledge concerning adhesives. The above described prior art, for example, selected the combination of thermoplastic polymethylmethacrylate as the support film 5 and biaxially oriented polymethylmethacrylate film as the protective film 1.

This prior art sheeting, however, has several drawbacks. One of them is that the connecting portions of the sheeting tends to be destroyed due to various external causes. The Japanese Preliminary Patent Publication No. 110592/1977 corresponding to U.S. Pat. No. 4,025,159 states in effect that the above described prior art reflex-reflecting sheeting which uses thermoplastic polymer is inadequate in its durability.

Although the Japanese Patent Publication No. 7870/1965 describes generally that hot-melt type thermosetting polymer may be used as the material for the support film, no specific example is given in the specification.

Secondly, the reflex-reflecting sheeting disclosed in Japanese Patent Publication No. 7870/1960 adopted such structure that, as shown in FIG. 2 of the Publication, the metallized layer 4, 4' covers the lower hemispheres of the glass beads 2 and the portion which is not occupied by the glass beads 2 in an uninterrupted layer. That is to say, the metal deposit constitutes an integral and continuous surface.

Since the area of the metallized layer 4' covering the portion which is not occupied by the glass beads 2 is considerably large in this structure, the reflecting sheeting appears dark.

For preventing light from reaching the upper surface of the metallized layer 4', a cover layer 9 of a bead-bond coating including a pigment such as a rutile type white pigment ($TiO_2$) as shown in FIG. 2 must be provided. A part of this coating is present between the surfaces of the lower hemispheres of the glass beads 2 and the metallized layer 4 and this intervening coating tends to prevent the incident light from reaching the metallized layer through the glass beads thereby giving rise to the tendency that the rate of light reflex-reflection of the sheeting is reduced.

Japanese Preliminary Patent Publication No. 110592/1977 is a prior art directed to eliminate the above described drawback of the reflex-reflecting sheeting disclosed in Japanese Patent Publication No. 7870/1965, i.e., the inadequate durability due to utilization of a part of the support film of thermoplastic polymer as the connecting wall to the protective film.

Different from the general description in the Japanese Patent Publication No. 7870/1965, this publication teaches that the adhesion of the support film to the protective film can be remarkably improved by employing a specifically selected composition for the main material of the support film, i.e., a special composition prepared by mixing into a mixture of acrylic-based thermoplastic polymer similar to the one disclosed in Japanese Patent Publication No. 7870/1965 ingredients such as monomer polyethylene glycol diacrylate, 2-cyanoethyl acrylate and 1,6-hexanediol diacrylate which are polymerized and cured by irradiation of ultraviolet ray, electron beam or heat ray.

It would be convenient if the adhesion of the support film to the protective film had improved by the above described employment of the specific material. This proposed sheeting, however, has also several problems.

In other words, although the above known sheeting may have sufficient adhesion in the interface of the support film and the protective film, strength of the portion of the connecting wall for connecting the support film with the protective film is not much different from the sheeting in which the thermoplastic support film is employed and besides strength inside the connecting wall is not necessarily sufficient.

More specifically, as shown in FIG. 2, when peeling force is applied to the reflecting sheeting, breaking of the sheeting occurs not in the interface A of the support film material and the protective film but in the plane taken along line B–B' or the plane taken along line C–C' of the connecting wall 6.

This is considered to be only natural, when the fact that metal deposits and a considerable number of glass beads are included in the connecting wall 6 formed by a part of the material of the support film 5 is taken into consideration. In addition, it may be said that addition of a photosensitive monomer to the support film material tends to decrease breaking or peeling strength due to deterioration caused by the outdoor light.

The employment of a biaxially oriented film as the protective film in the respective patents seemingly is an advisable selection for increasing properties of the protective film including strength, permeability resistance and transparency.

It has, however, been confirmed by the inventor of the present invention that such selection actually is not advisable at all.

In fact, the reflecting sheetings of the above prior arts exhibit remarkable shrinkage when heated. More specifically, when the support film materials, i.e., bonding materials disclosed in Japanese Patent Publication No. 7870/1965 and Japanese Preliminary Patent Publication No. 110592/1977, are utilized, the reflecting sheetings shrink significantly in the condition that the sheetings are permitted to stand for 3 hours in an atmosphere at 93° C. and then immersed in water for 21 hours, and such operation is repeated two or three times. Besides, at the higher temperature of 145° C., the protective film 1 is curled in about only 1 or 2 minutes and peels from the remaining portion, resulting in complete destruction of the sheeting.

Moreover, the problem arising from the fact that a metallized layer exists over the support film in the portion which is not occupied by glass beads remains unsolved in the reflecting sheeting disclosed in Japanese Preliminary Patent Publication No. 110592/1977. This is because there is no structural difference between the Preliminary Patent Publication No. 110592/1977 and the first described prior art except that the binder, i.e., the support film 5 of a thermoplastic polymer in the prior art is merely replaced by one of a hot-melt type setting polymer.

Further, for manufacturing the reflecting sheeting employing the known setting type resin for the support film, it is required that the production line after partial thermoforming of the support film be provided with a special apparatus such as ultraviolet or heat ray irradiating apparatus, and the support film be irradiated for a certain period of time after thermoforming of the connecting wall.

For instance, in Examples 1–3, 5–10, and 12–14 of Japanese Preliminary Patent Publication No. 110592/1977, samples have been irradiated with a 190-kilovolt electron beam to a dose of 1.5 megarads by employing an electron beam irradiating apparatus, whilst in Example 4, the sheeting has been irradiated with ultraviolet rays using two passes at a rate of 50 ft./min. for curing the support film.

In Example 11, the support film has thermally been cured by heating for 16 hours at 65° C. with the use of a heating device. In this respect, Preliminary Patent Publication No. 110592/1977 itself states in effect that such heat radiation for a long period of time is not desirable.

As described above, it is a significant disadvantage in manufacturing reflecting sheetings to require an operating step in which a special apparatus must be used for curing polymer.

SUMMARY OF THE INVENTION

Accordingly, it is an object of the present invention to provide a capsule type reflex-reflecting sheeting capable of eliminating the disadvantages in the above-mentioned prior art reflecting sheetings and having such an excellent connecting structure between a support film and a protective film as to be difficult to break under severe temperature and humidity.

The construction of the present invention by which the above described object can be attained will be described hereinbelow.

The construction of the reflex-reflecting sheeting according to the present invention is as described in the appended Claim 1, but some explanations will be added herein for more complete understanding.

A means adopted in the present invention for solving the above-mentioned problems is that the support film is composed of an upper layer and a lower layer which have different compositions and physical properties from each other at least when the support film is adhered to the protective film such that the upper layer has larger adhesive force than that of the lower layer, whilst the lower layer has higher resistance to cohesive failure and rubbery elasticity than that of the upper layer, and the upper and lower layers are formed into the integral support film.

It is another characteristic feature of the present invention that a film which is devoid of substantial improvement in strength by means of stretching is utilized as the protective film in place of a biaxially oriented film which has been generally employed in the art.

Furthermore, the object of the present invention can be attained more fully by adopting such a construction wherein the superfluous metallized layer is completely removed so that there is no requirement for a binder containing the pigment for shielding the metallized layer existing in a portion which is not occupied by glass beads.

By employing a specific support film material, the reflecting sheetings having the above described construction can be manufactured by the simple manufacturing method disclosed in Japanese Patent Publication No. 7870/1965 without requiring any special irradiating apparatus appearing in the technique disclosed in Preliminary Patent Publication No. 110592/1977.

BRIEF DESCRIPTION OF THE DRAWINGS

In the accompanying drawings.

DETAILED DESCRIPTION OF THE INVENTION

Figure 4:
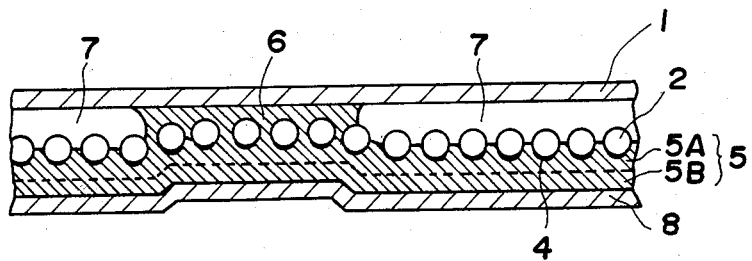
FIG. 4 is a partly enlarged sectional view showing the reflecting sheeting according to the present invention.

An example of the construction of the finished sheeting prior to attaching a release paper thereto for delivery is shown in FIG. 4. A protective film 1 is partially connected with a support film 5 by means of a connecting wall 6 formed by thermoforming of the support film 5. The inside spaces surrounded by the wall 6 constitute hermetically sealed pockets or cells 7. The lower hemispheres of glass beads 2 are embedded in an upper layer 5A of the support film 5, whereas the surfaces of the upper hemispheres thereof are exposed from the surface of the upper layer 5A in the cells 7. The surfaces of the lower hemispheres of the beads 2 constitute a reflective surface covered with a metal vaporcoated film. This structure is the same as that of the conventional capsule type reflecting sheetings.

Since the characteristic feature of the present invention resides in correlation between the upper layer 5A and the lower layer 5B of the support film 5 in ingredients or compositions and physical properties as well as the combined structure of the two layers of the support film 5, these points will be described more in detail hereinbelow.

The support film in the present invention must possess favorable adhesion to the protective film, and such adhesion is not determined one-sidedly by the principal component of the support film but depends upon relationship of the support film with the composition of the protective film.

One of the best combinations includes a combination of the protective film containing acrylic copolymer as the principal component and the support film containing acrylic-based polymer as the principal component.

It is, however, to be noted that the present invention is not limited to the above described combination, but any combination of the protective film made of a suitable polymer and the support film made of a crosslinked polymer may be utilized in the present invention. Hence a combination in which, for example, the protective film comprises polycarbonate or polyvinyl chloride as the principal constituent and the support film comprises saturated polyester or linear polyurethane as the principal constituent can also be accepted.

The support film is made of a pasty material or by heating a thermoplastic material into a state in which the connecting wall can be formed. It should preferably be of a nature that it is crosslinked to cure at room temperatures before or after the formation of the connecting wall.

Particularly, it is preferable in the present invention that polyisocyanate whose crosslinking reaction proceeds at room temperatures be included in components of the support film, and a polymer having an active group such as OH group which reacts with polyisocyanate be employed as the principal constituent of the support film.

It is very advantageous for producing the reflecting sheetings according to the present invention that all the curing means such as heating for a long period of time and electron beam irradiation, etc. can be omitted by utilizing hot-melt adhesive materials of the cold-setting type.

In the present invention, in order to secure a sufficient internal strength of the thin connecting wall for connecting the support film with the protective film and prevent breaking inside the wall due to cohesive failure, the support film is made of a combined structure comprising at least the upper and lower layers having different physical properties from each other.

It is required that composition of the upper layer of the support film should have good adhesion to the protective film and, at the same time, possess favorable affinity for the lower layer so that the upper and lower layers can be integrated together. In this respect, it is preferable that polymers constituting basic ingredients of these two layers are of the same type. For example, these polymers preferably are acrylic-based copolymers of the same tertiary or quaternary system polymers.

Figure 1:
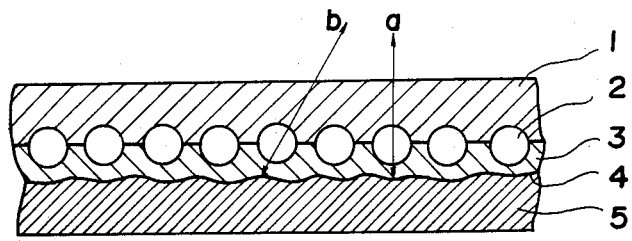
FIG. 1 is a schematic sectional view showing an oridnary reflecting sheeting of a conventional type.
Figure 2:
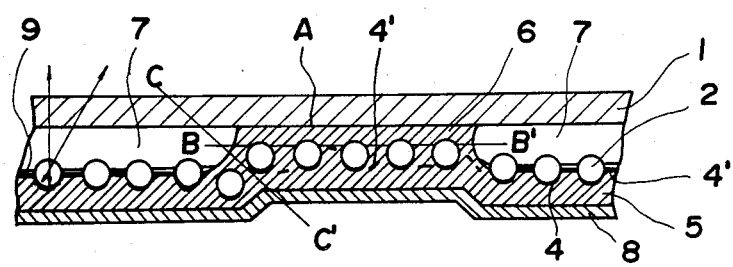
FIG. 2 is a schematic sectional view showing a known reflecting sheeting of a capsule type.
Figure 3:
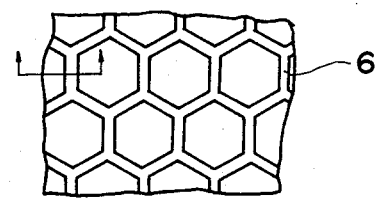
FIG. 3 is a schematic view showing the surface of the reflecting sheeting of FIG. 2.

Viscosity of the support film at the time of thermoforming thereof should be low for wetting sufficiently the protective film and the glass beads and thereby making the adhesion of the support film to the protective film favorable and increasing the strength of the resulting sheeting in the plane taken along line B–B' of FIG. 2. However, if the viscosity is lowered as described above, the support film stretches with a result that the portion taken along line C–C' of FIG. 2 is thinned and the finished sheeting is apt to be broken here. This is the disadvantage of this type of prior art reflecting sheetings.

In view of the above described problem, the inventor of the present invention has found that improvement of reflecting sheetings can be effectively attained by forming the support film by integral layers comprising at least the upper and lower layers having different properties from each other. More specifically, an important characteristic feature of the present invention resides in that the upper layer 5A of the support film 5 is made of a material having such composition that the viscosity thereof is low at the time of thermoforming, whilst the lower layer 5B is made of a material having such composition that it scarcely flows at the time of the thermoforming, and these materials having such different properties from each other are integrally combined with each other to form the support film.

When resin materials having different curing rates from each other or having different degrees of cure upon forming from each other are utilized as the upper layer 5A and the lower layer 5B of the support film 5, the above-mentioned advantage can be attained. It is also an advantage of the invention that, by employing isocyanate or other material which cures at room temperatures in the support film, occurrence of internal stress in the support film due to an external energy can be prevented and the support film has further increased internal strength after curing thereof.

The upper and lower layers of the support film having such construction as described above should preferably not have the quite same compounding ingredients. Namely, a material having a good wetting property relative to the protective film during thermoforming should be used for the upper layer material, whilst another material exhibiting large resistance to cohesive failure and large rubbery elasticity (JIS K6200) and, accordingly, having large stress against an external force and having tendency to rapid elastic restoration to the original state should be used for the lower layer.

By employing the support film of such construction, the upper layer performs the function of a cushion readily following expansion and contraction of the protective film whereas the lower layer performs the function of restricting the expansion and contraction of the upper layer to the minimum by virtue of the rubbery elasticity thereof whereby rupture of the connecting wall is effectively prevented.

In order to satisfy the above conditions, a copolymer which is the basic ingredient contains an active group which is to react with isocyanate or the like. The active group may be contained in a smaller amount in the upper layer than in the lower layer so that the degree of cure or degree of crosslinking in the upper layer during adhesion to the protective film may be reduced.

The adjustment of the degree of cure may conveniently be effected by adjusting the amount of a monomer including OH groups such as dihydroxymethyl methacrylate to be added to a mixture of monomer ingredients such as methyl methacrylate, ethyl methacrylate, butyl methacrylate which constitute a copolymer as the material of the upper layer in the support film, i.e., by making the amount of the former monomer in the upper layer smaller than that in the lower layer. Alternatively, a catalyst for accelerating reaction of polyisocyanate may be included in the materials for forming the lower layer, or polyisocyanate of faster reaction may be used in the lower layer.

The support film as described above may be constructed in such a manner that a material film which forms the upper layer in the support film is first pushed against the surfaces of lower hemispheres of glass beads which have been metallized to have the lower hemispheres of the beads embedded substantially and then a lower layer film is laminated to the upper layer.

Alternatively, the upper layer film may be previously laminated to the lower layer film and then the resulting laminates may be pushed against the glass beads.

In both of the above cases, it is important that the upper layer of the support film should have thickness sufficient for completely embedding substantially the lower hemispheres of the glass beads, while the lower layer should be sufficiently thinner than the upper layer.

In either case, it is convenient to use a support film which is formed by coating a material on a base film which does not firmly adhere to the support film or on a base film with a suitable releaser layer provided in between the support film and the substrate polymer film.

It will be readily understood that the support film comprising the upper and lower layers as mentioned above need not necessarily have a laminated structure which can be perfectly distinguished from each other but the interface of the two layers may rather be in such condition that it cannot be clearly distinguished.

As described above, the protective film should not be made of homopolymers of polymethyl methacrylate or polycarbonate. Films of these materials have been found unsuitable as the protective film for the construction of the reflecting sheetings according to the present invention. Furthermore, contrary to the general knowledge prevailing in the art, it has also been found unsuitable for the protective film of the reflecting sheetings that the films made of these materials are biaxially oriented. It has been confirmed by the inventor of the present invention that the film made of biaxially oriented polymer readily peels from the connecting wall formed by a part of the support film or causes cohesive failure in the connecting wall when the reflecting sheeting is exposed to a relatively high temperature.

Under these circumstances, a biaxially oriented polymethyl methacrylate film which has heretofore been practically utilized should not be employed as the protective film in the present invention. It is desirable to use, if possible, copolymers which are prepared by copolymerizing acrylic copolymers and synthetic rubber, Cellosolve acetate butyrate, styrene or the like, or a mixture of a part or all of these materials. In short, it is desirable to utilize a material which is stronger and more stretchable than a homopolymer of polymethyl methacrylate.

It is not sufficient for the support film of the present invention to have favorable thermal adhesion to the protective film but attention should be paid so that internal failure will not occur in a connecting wall portion for connecting the support film and the protective films to each other for defining small hermetically sealed cells between the two films. The support film material according to the present invention which does not contain a photosensitive monomer has less tendency to deterioration due to light than materials containing such photosensitive monomer, but strength reduction due to temperature change and moisture absorption must be further taken into consideration.

In a case where a thin connecting wall of continuous lines for connecting the support film with the protective film is formed by thermoforming the support film in a reflecting sheeting wherein surfaces of the lower hemispheres of glass beads as well as the surface of the support film exposed in portions between the respective beads are covered with a metallized layer without a gap, metal deposits separated from the surface of the support film as well as a considerable number of metallized glass beads are included in the above thin connecting wall.

If such foreign matters exist in the connecting wall, the inside of the thin wall of continuous lines is apt to be weakened due to internal strain caused by temperature change and moisture absorption to which the reflecting sheeting is subjected.

In the present invention, the above stated problem is also solved, because no metal film remains on the surface of the support film in the portion which is not occupied by the glass beads.

Methods for preventing retention of the metallized layer on the surface of the upper layer 5A of the support film in the portion not occupied by the glass beads include one in which the beads are first supported by a provisional support in the known manner, the beads thus supported are subjected to the metallizing step, a polymer having comparatively good adhesive force with respect to the provisional support and the metallized layer whilst having comparatively weak adhesive force with respect to the support film is then coated on the provisional support in a thin layer, thereafter the support film is provided thereon, and then the provisional support and the above stated polymer layer which has been coated thereon are peeled off together from the support film. Whatever the method may be, it must be one in which the provisional support and the metallized substance thereon do not directly contact with the support film.

In making reflecting sheetings, details of the mechanism of curing of the support film in a preferred embodiment according to the present invention will be different from that disclosed in Japanese Preliminary Patent Publication No. 110592/1977. More specifically, since each molecule of the thermoplastic polymer disclosed in Preliminary Publication Patent No. 110592/1977 has no particular active group, principally monomers added therein are believed to polymerize one another to cure the whole composition.

On the other hand, it is preferable in the present invention that one or more among several components to be copolymerized in a material used for the support film have active groups, chain molecules having a number of active groups are produced by the copolymerization of these components, and these chain molecules are crosslinked as a whole by polyisocyanate.

Accordingly, it will be acknowledged that the structure of the support film described in Preliminary Patent Publication No. 110592/1977 differs from that of the support film of the reflecting sheeting according to the present invention.

The principal points which have been discussed hereinbefore will now be summarized. The prior art capsule type reflecting sheetings wherein a part of the support film has been bonded to the protective film as the connecting wall have inadequate resistance to breaking or peeling of the connecting wall portion under high temperature and humidity. Conceivable improvements are to strengthen the portion of the connecting wall and to reduce force which acts destructively by an external cause due to the structure of the sheeting itself. The strengthening of the connecting wall consists of increase of interfacial adhesive force between the protective film and the connecting wall and increase of cohesive force of the connecting wall itself. It has heretofore been believed that such protective film as described above has sufficient strength and there is also no problem as to cohesive force of such connecting wall, so that consideration has solely been given to strengthening of the aforesaid interfacial adhesive force.

However, this consideration is not necessarily appropriate but it is necessary to strengthen the connecting wall itself rather than to intensify the interface adhesion. Namely, it has been confirmed that sheetings are broken due to cohesive failure in most cases. Moreover, it has also been confirmed that a protective film strengthened by biaxial orientation makes the resulting sheeting easy to break and, although such protective film may also be used, it is not optimum in relation to the structure of the prior art support films.

Thus, solution of the above problem resides in strengthening of the connecting wall itself, and preferably in the use of a protective film which has not been strengthened by biaxial orientation to an ordinary degree.

Since the connecting wall is composed of a part of the support film, the support film must possess both cushioning properties which are required for the support film and strength which is required for the connecting wall. In this respect, it is very difficult to satisfy such requisites by the use of a monolayer film of a single component. Accordingly, the upper layer of the support film should be made different from the lower layer thereof in their compositions and physical properties so that a compounding exhibiting favorable adhesion to the protective film is selected for the former, whilst a compounding suitable for maintaining strength is selected for the latter. Remarkable improvement can be achieved by such structure of the support film. Further, if possible, separated metal deposits which are disadvantageous both for preventing cohesion failure and for appearance should be removed from the connecting wall.

For strengthening the support film, setting type resin materials are utilized and cold-setting isocyanate-based components may advantageously be used for improving adhesion of the support film to the protective film and beads as well as to a metallized component included in the connecting wall and also for simplification of the operating steps.

For better understanding of this invention, several examples will be described hereinbelow.

EXAMPLE 1

In Example 1, a support film formed by crosslinking acrylic-based compositions with polyisocyanate and thereby curing them and a protective film containing an unstretched (unoriented) acrylic-based copolymer as the principal constituent are employed.

The protective film 1 has a thickness of about 80 μm, and glass beads 2 each having 1.92 refractive index and 50–60 μm diameter are scattered with a ratio of 140 g/m². A metallized layer 4 on the lower hemispheres of the glass beads is formed by means of vacuum metallizing of metallic aluminum, whilst no metallized film exists on the surface of the support film 5. The respective compositions of the upper layer 5A and the lower layer 5B of the support film 5 are as indicated in the columns of Example 1 in the following Table 1 and the corresponding columns in the list of material ingredients of the following Table 2, and a thickness of the upper layer is about 80 μm, while a thickness of the lower layer is about 30 μm.

A method for making the reflecting sheeting is substantially the same as that of the aforementioned prior art, so that the explanation therefor will be omitted in order to avoid repetition except for the following supplementary explanation.

The glass beads which are scattered on the provisional support and the lower hemisphere portions of which are covered with a metallized layer are then coated with a material which becomes the upper layer 5A of the support film 5. The so coated provisional support is dried at 60° C. for 5 min. and further at 90° C. for 5 min. Then the provisional support thus dried is coated with a material which becomes the lower layer 5B of the support film 5. The resulting provisional support is dried at 70° C. for 2 min. and further at 90° C. for 2 min.

Figure 5:
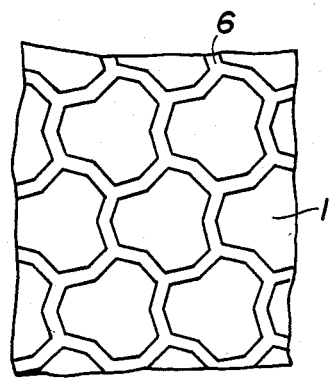
FIG. 5 is a view showing an example of surface pattern constituting the connecting wall in the reflecting sheeting according to the present invention.

A heat resistant film 8 is made of a saturated polyester film of about 15 μm, the laminating temperature of which is about 40° C. A connecting wall 6 is pressed into shapes at 170° C. in accordance with the known method. The surface pattern formed by the connecting wall of continuous lines is as shown in FIG. 5.

EXAMPLE 2

Example 2 has essentially the same construction as that of Example 1 except that a compounding ratio of acrylate constituting the principal constituent of the upper layer 5A of the support film 5, a kind of polyisocyanate, and amounts of polyisocyanate as well as titanium dioxide differ from those of Example 1 as indicated in Tables 1 and 2.

Further, glass beads 2 each having a diameter 40–50 μm are scattered over with a ratio of 130 g/m², and a dry thickness of the upper layer 5A of the support film 5 is 100 μm, while a dry thickness of the lower layer 5B is 40 μm.

EXAMPLE 3

In Example 3, a saturated polyester composition and a polycarbonate film are utilized for the upper layer 5A of the support film 5 and the protective film 1, respectively. The ingredients constituting the upper layer 5A of the support film 5 and the compounding ratio thereof in the present example differ from those of Example 1 as indicated in Table 1, but other conditions are the same as Example 1.

In the production process, drying conditions after coating the upper layer 5A of the support film 5 are 60° C. and 3 min. followed by 90° C. for 3 min., these periods being shorter than those of Example 1.

EXAMPLE 4

Example 4 has the same construction as that of Example 3 except that the upper layer 5A of the support film 5 is made of a linear polyurethane composition as indicated in Tables 1 and 2, amount of titanium dioxide added thereto is smaller, and a polyvinyl chloride film is used as the protective film 1 as indicated in Table 1.

In the production process, a composite material fabricated by forming the lower layer 5B of the support film 5 on the provisional support and overlaying the upper layer 5A thereon is overlaid upon glass beads, and the other steps are the same as Example 3.

EXAMPLE 5

Example 5 has substantially the same construction as that of Example 1 as indicated in Table 1. However, the amount of the polyisocyanate in the lower layer 5B of the support film 5 is smaller than that of Example 1, and tertiary amine manufactured by Koei Kagaku Kogyo K.K. is added as its catalyst in an amount corresponding to 0.2% of the amount of polyisocyanate.

In the production process, thermoforming temperature for forming the connecting wall 6 is 200° C.

In this case, polyisocyanate (Trade name "Takenate D-110N") manufactured by Takeda Yakuhin Kogyo K.K. or the like polyisocyanate having higher reactivity than those used in the above respective Examples may be utilized without employing the aforesaid catalyst.

TABLE 1

| | List for Film Composition | | | | | |
| --- | --- | --- | --- | --- | --- | --- |
| | Support Film | | | | | |
| | Upper Layer | | | Lower Layer | | |
| | Principal Component | Polyisocyanate | Rutile Titanium Dioxide | Principal Component | Polyisocyanate | Protective Film |
| Example 1 | A 100 | a 1.4 | 40 | C 100 | a 14 | Unoriented film based on acrylic-copolymer |
| Example 2 | B 100 | b 1.0 | 30 | C 100 | b 14 | Unoriented film based on acrylic-copolymer |
| Example 3 | D 100 | b 1.0 | 20 | C 100 | b 14 | Unoriented polycarbonate film |
| Example 4 | E 100 | b 1.0 | 20 | C 100 | a 14 | Unoriented polyvinyl chloride film |
| Example | A | a | 30 | C | a | Unoriented film |

TABLE 1-continued

| | List for Film Composition | | | | | |
|---|---|---|---|---|---|---|
| | Support Film | | | | | |
| | Upper Layer | | | Lower Layer | | |
| | Principal Component | Polyisocyanate | Rutile Titanium Dioxide | Principal Component | Polyisocyanate | Protective Film |
| 5 | 100 | 1.5 | | 100 | 12 | based on acrylic-copolymer |

*1 The compositions of the principal components in the upper and lower layers 5A and 5B are as indicated in Table 2.
*2 Polyisocyanate a denotes "Desmodur N-75" manufactured by Bayer A.G., West Germany and b designates "CORONATE EH" manufactured by Nippon Polyurethane Industry Co., Ltd.
*3 Numerical values mentioned in the above Table are indicated by parts by weight.
*4 The polycarbonate film is "PANLIETE 80" having 80 μm thickness manufactured by Teijin Ltd.
*5 The polyvinyl chloride film is "HISHIREX" having 80 μm thickness manufactured by Mitsubishi Plastics Industry, Ltd.

TABLE 2

| | List for Principal Components of Film |
|---|---|
| Principal Component A | Acrylic composition adjusted to give a 40% solids solution by polymerizing acrylic monomers including 40% of methyl methacrylate, 55% of ethyl acrylate, and 5% of 2-hydroxyethyl methacrylate in a mixed solvent consisting of toluene and methyl isobutyl ketone |
| Principal Component B | Acrylic composition adjusted to give a 40% solids solution by polymerizing acrylic monomers including 50% of methyl methacrylate, 45% of ethyl acrylate, and 5% of 2-hydroxyethyl methacrylate in a mixed solvent consisting of toluene and methyl isobutyl ketone |
| Principal Component C | Acrylic composition adjusted to give a 40% solids solution by polymerizing acrylic monomers including 21% of methyl methacrylate, 65% of ethyl acrylate, and 14% of 2-hydroxyethyl methacrylate in a mixed solvent consisting of toluene and methyl isobutyl ketone |
| Principal Component D | Saturated polyester composition ("VYLON 300" manufactured by Toyobo Co. Ltd.) adjusted by a mixed solvent consisting of toluene and methyl ethyl ketone to give a 30% solids solution |
| Principal Component E | Linear polyurethane composition ("N-3022" manufactured by Nippon Polyurethane Industry Co. Ltd.) adjusted by ethyl acetate solvent to give a 35% solids solution |

Preferred examples have been given above, but it is to be understood that the present invention is not limited to the above examples.

The support film 5 is made of setting type polymer materials and has an integral structure comprising at least the upper and lower layers which are preferably different in the degree of crosslinking, and hence in resistance to cohesive failure and extensibility from each other and at the same time have affinity to each other. Particularly, the upper layer may be made of any material having better adhesion to the protective film and also better cushioning property for supporting beads than the lower layer, whilst the lower layer may be made of any material having a strength sufficient to withstand breaking inside the connecting wall.

The material for the support film need not necessarily be a cold-setting type polymer, but a material which is cured by heating or other conventional means may also be used. It is, however, necessary that physical properties of the upper layer during thermoforming differ from those of the lower layer. An additional thin layer may be interposed between the upper and lower layers.

While the advantages of the present invention will be apparent from the above description, a brief summary thereof will be given as follows:

The reflecting sheeting according to the present invention is of a construction wherein the support film comprises at least the upper and lower layers having different compositions and physical properties from each other and the protective film is made of an unoriented film, so that the resulting sheeting exhibits strong resistance to interface failure or cohesive failure in the connecting wall portion caused by the external force or deterioration due to aging and, in addition, the sheeting can prevent effectively occurrence of shrinkage and deformation due to heating. Particularly, since an unoriented film is utilized as the protective film, advantages derived are significant. Furthermore, when useless metallized layer in the portion other than the surfaces of the lower hemispheres of glass beads is not retained, there is no need for a countermeasure which is required in a case where such metallized layer exists such, for example, as provision of a binding material layer containing a pigment for covering the remaining metallized layer. As a result, decrease in reflectivity in the beads existing in the cells which could occur when such countermeasure was taken can be effectively prevented.

The reflecting sheeting according to the present invention exhibits favorable bonding of the protective film to the support film so that the sheeting has strong resistance against separation of the two films even under high temperatures in places of severe heat. For instance, when a conventional reflecting sheeting is left to stand at a temperature of 145° C. for 1-2 minutes, the protective film shrinks and peels off resulting in deformation to such a degree that the original shape can hardly be recognized. In contrast thereto, substantially no change is observed in the reflecting sheeting made according to the present invention.

Specific data demonstrating the above results will be shown hereinbelow.

Table 3 indicates results of a heat shrinkage test wherein each square sample of 100 mm × 100 mm was cut out from the sheetings in which the known thermoplastic support film and thermosetting support film supplied by Minnesota Mining and Manufacturing Company were used and from the sheetings made on experimental basis according to Examples 1 and 2 of the present invention, each cut out sample was bonded to an aluminum plate, and the sample was heated at 145° C. for 2 minutes.

TABLE 3

| | Heat Shrinkage Test | |
|---|---|---|
| | Vertical Direction (mm) | Horizontal Direction (mm) |
| Examples 1, 2 | 99 mm | 99.5 mm |
| Prior art Film A (Thermoplastic Type) | 0 | 0 |
| Prior art Film B (Thermosetting Type) | 75 mm | 65 mm |

Table 4 indicates results of a heat-water cycle test. More specifically, Table 4 indicates results of measurement of actual dimensions and a peel test made in respect of the sheeting in which the known thermosetting type support film was used and the sheetings made on experimental basis according to Examples 1 and 2 of the present invention after the following test were repeated for 3 days, in other words, 3 cycles. The test was conducted in such a manner that each square sample of 100 mm×100 mm was cut out from the prior art sheeting and the sheetings made according to the present invention, each cut out sample was bonded to an aluminum plate, the sample was heated at 93° C. for 3 hours, and then the heated sample was immersed in water of 20° C.

TABLE 4

|  | Vertical Direction (mm) | Horizontal Direction (mm) | Appearance | Peel Test |
|---|---|---|---|---|
| Examples 1, 2 | 99.5 mm | above 99.5 mm | Substantially the same as state prior to the test | Cannot be peeled off but the protective film breaks |
| Prior art Film | 97.5 mm | 96.5 mm | Connecting wall damaged in the outer peripheral portion with 15 mm breadth | Being easily peeled off by hands |

According to the method for making reflecting sheetings of the preferred embodiment of the present invention, the support film material is cured at room temperatures so that no apparatus for effecting electron beam or ultraviolet ray irradiation or heat ray irradiation for a long period of time is required. It is also an advantage of the preferred embodiment that no particular step is required after thermoforming of the connecting wall.

What is claimed is:

1. Reflex-reflecting sheeting in which a monolayer of glass beads are supported by a support film made of a synthetic resin with their metallized lower hemispheres being substantially embedded in said support film and a large number of separate, hermetically sealed small cells are defined between a transparent protective film made of a synthetic resin and provided above exposed surfaces of said glass beads and said support film by a connecting wall of continuous lines formed by partial thermoforming of said support film characterized in that said support film comprises at least an upper layer which is in contact with said glass beads and a lower layer disposed on a side opposite the side of said upper layer in contact with said glass beads, said lower layer is of such a composition that said lower layer has larger cohesive force and rubbery elasticity than said upper layer and said protective film is a substantially unoriented film.

2. Reflex-reflecting sheeting as defined in claim 1 characterized in that said support film is composed of a cold-setting polymer cross-linked by polyisocyanate.

3. Reflex-reflecting sheeting as defined in claim 2 characterized in that said upper layer contains a smaller amount of polyisocyanate and active group to react with polyisocyanate than said lower layer.

4. Reflex-reflecting sheeting as defined in claim 3 characterized in that said lower layer contains a catalyst which accelerates reaction of polyisocyanate.

5. Reflex-reflecting sheeting as defined in claim 3 characterized in that said lower layer contains polyisocyanate of faster reaction.

6. Reflex-reflecting sheeting as defined in claim 1 characterized in that the lower hemispheres of said glass beads do not reach said lower layer of said support film but are supported only by said upper layer.

7. Reflex-reflecting sheeting as defined in claim 1 characterized in that surface of said support film in which a portion spacing adjacent glass beads from each other is free of metal deposit is exposed directly in said hermetically sealed small cells.

8. Reflex-reflecting sheeting as defined in claim 1 characterized in that said connecting wall of continuous lines connecting said protective film with said support film is free of any metal deposit other than the metallized layer on said glass beads existing in said connecting wall.

9. Reflex-reflecting sheeting as defined in claim 1 characterized in that said protective film comprises unoriented acrylic-based copolymer as the principal component.

10. Reflex-reflecting sheeting as defined in claim 9 characterized in that said support film further comprises acrylicbased copolymer as the principal component.

11. Reflex-reflecting sheeting as defined in claim 1 characterized in that said protective film further comprises unoriented polycarbonate as the principal component.

12. Reflex-reflecting sheeting as defined in claim 11 characterized in that said support film further comprises saturated polyester composition and acrylic composition as the principal components.

13. Reflex-reflecting sheeting as defined in claim 1 characterized in that said protective film further comprises unoriented polyvinyl chloride as the principal component.

14. Reflex-reflecting sheeting as defined in claim 13 characterized in that said support film further comprises linear polyurethane composition and acrylic composition as the principal components.

* * * * *